United States Patent Office 2,918,501
Patented Dec. 22, 1959

2,918,501

INTERNALLY UNSATURATED PERFLUOROOLEFINS AND PREPARATION THEREOF

Warren John Brehm, Keith George Bremer, Herbert Sousa Eleuterio, and Robert Walter Meschke, all of Wilmington, Del., assignors to E. I. du Pont de Nemours and Company, Wilmington, Del., a corporation of Delaware No Drawing. Application February 27, 1958
Serial No. 717,820

14 Claims. (Cl. 260—653.3)

The present invention relates to novel perfluorinated olefins and a method for their preparation, and more particularly to thermally and chemically stable perfluoroolefins.

The preparation of solvents containing only fluorine and carbon which are liquid at room temperature and boil in the temperature range of water, properties desirable for solvents, has been difficult and expensive. These solvents can be prepared by the decarboxylation of alkali metal salts of perfluorinated acids and subsequent fluorination, by the pyrolysis of such polymers as polytetrafluoroethylene, or by the pyrolysis of low boiling perfluoroolefins or perfluoroalkanes such as tetrafluoroethylene, hexafluoropropylene, hexafluoroethane, etc. These methods, however, are economically not attractive since they involve either the use of expensive starting materials or give rise to the desired products in only low yields.

It is therefore one of the objects of the present invention to prepare completely fluorinated solvents; it is another object of the present invention to prepare completely fluorinated olefins having high stability which are liquid at room temperature and are chemically substantially inert. It is a further object of the present invention to provide a simple and economic process for the preparation of completely fluorinated solvents. Other objects will become apparent hereinafter.

The objects of the present invention are accomplished by a process which comprises contacting a terminally unsaturated perfluoroolefin having at least 3 carbon atoms with catalyst-solvent combinations comprising (a) halides and hydroxides of metals of group I of the periodic table of elements as catalysts in combination with solvents of the class consisting of N,N-dialkylamides, N,N-dialkylphenylamines and dialkylsulfoxides and (b) quaternary ammonium salts having the general formula $R_4NX$ where R is a hydrocarbon radical and X is an anion as catalysts in combination with inert solvents of the class consisting of hydrocarbons, N,N-dialkylamines and N,N-dialkylamides at a temperature of 0° to 200° C. and recovering internally unsaturated perfluoroolefins. The catalysts employed in the present invention are compounds which are strongly nucleophilic. Some of the listed solvents which are also strongly nucleophilic, such as dimethyl sulfoxide, may consequently be employed in the process without a catalyst, although in general only low yields are obtained. Although not catalytically active as a class, other specific nucleophilic compounds, such as methanol, may also be employed. In particular embodiments the process of the present invention comprises reacting hexafluoropropylene with the said catalyst-solvent combinations and recovering internally unsaturated dimers and trimers of hexafluoropropylene having the empirical formulas $C_6F_{12}$ and $C_9F_{18}$, respectively.

The metals of the metal halide and hydroxide catalysts employed in the process of the present invention are those found in group I of the periodic table of elements (Mendeleff's Periodic Table, as disclosed in the Handbook of Chemistry and Physics, Chemical Rubber Publishing Company, 37th edition) and include, in addition to the alkali metals, gold, silver and copper. Although all halides may be employed, the preferred halides are the fluorides and bifluorides. The quaternary ammonium compounds employed as catalysts in the process of the present invention are preferably halides and hydroxides.

The solvents suitable in the process of the present invention are, as stated hereinabove, alkyl-substituted amides, phenylamines and sulfoxides with the metal halide catalysts and hydrocarbons, alkyl-substituted amides and amines with the quaternary ammonium compounds. The alkyl substitution has no critical effect on the reaction itself and, consequently, any alkyl substituted amide phenylamine and sulfoxide may be employed as along as it is liquid at reaction conditions. Preferably, substituted amides, amines, phenylamines and sulfoxides are employed which have alkyl substituents of one to three carbon atoms. Similarly, the acyl radical in the substituted amide is not critical, may be greatly varied and includes such acyl radicals as the formyl-, acetyl-, propionyl-, butyryl-, and benzoyl radical. All hydrocarbon solvents, liquid at reaction conditions may be employed.

The novel products obtained by the process of the present invention are dimers and trimers of perfluoropropylene which have internal unsaturation. The dimers of the present invention have the formulas

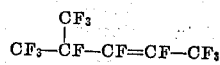

and

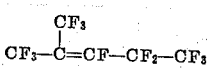

and the trimers of the present invention have the formulas

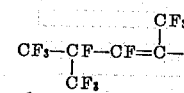 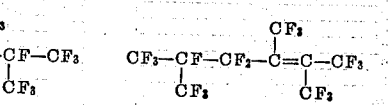

and

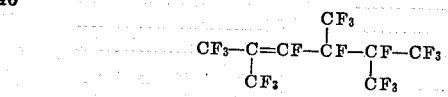

Although the mechanism leading to the formation of the internal double bond is not clearly understood, it is believed that the internally unsaturated dimers and trimers are formed by the reaction of a perfluoroisopropyl anion with hexafluoropropylene or correspondingly with the dimer of hexafluoropropylene. The resulting unstable molecule looses a fluoride ion to form the stable olefin. The reaction mechanism appears to favor the loss of a fluoride ion from a non-terminal carbon, however, loss from a terminal carbon also appears to be possible. This is shown by the fact that the presence of the terminally unsaturated dimers having the formulas

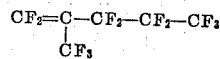

and

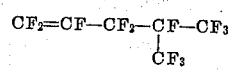

was detected in the reaction mixture. It was, as a matter of fact, discovered that the process of the present invention could be utilized to isomerize all types of terminally unsaturated perfluoroolefins and omega-hydroperfluoroolefins into internally unsaturated perfluoroolefins and 1-hydroperfluoroolefins respectively. Isomerization from one form of internally unsaturated dimer or trimer to another type of unsaturated dimer or trimer was also found to be possible employing the process of the present invention.

The reaction is specific both with respect to the solvent employed and the catalyst employed. The reaction is preferably carried out at temperatures of 25° to 100° C. for periods of 1 to 6 hours. The pressure employed is not critical and any pressure, preferably above atmospheric pressure, is suitable. The quantity of the solvent employed is not critical but it is preferred to employ at least 10 weight percent of solvent on the basis of the reactant charged. The catalysts are generally employed in quantities varying from 0.001% to 10% by weight of the reactants charged. However, these limits are not critical to the preparation of the novel compounds of the present invention.

The invention is further illustrated by the following examples.

EXAMPLE I

Into a 320 ml. stainless steel reaction vessel was charged under a blanket of nitrogen at a temperature of —50° C. the solvent and quantity thereof, the catalyst and quantity thereof and the perfluoroolefin and quantity thereof indicated in the table below. The reaction vessel was heated to the reaction temperature indicated for a period of time also indicated with agitation. The products obtained on discharge separated into a solvent and fluorocarbon layer. The fluorocarbon layer was isolated, washed with water and dried over anhydrous sodium sulfate.

Analysis of the dimer boiling at 50.5° C. showed a strong band in the 5.9 micron region of the infrared spectrum indicating the existence of a double bond. Oxidation of this dimer in an aqueous medium at 100° C. for two hours using alkaline sodium permanganate resulted in the formation of fluoroform and pentafluoroethane. Thus the structure of the dimer boiling at 50.5° C. was determined to be perfluoro-2-methylpentene-2

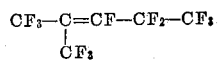

This structure was further confirmed by nuclear magnetic resonance.

The trimer fraction was similarly distilled and three trimers were identified which boiled at 105–6° C., 110° C. and 114° C., respectively. The trimer boiling at 110° C. showed a strong band at 6.05 microns in the infrared spectrum. Oxidation of the trimer by the method described above gave rise to the formation of 2-hydroheptafluoropropane and fluoroform. These results are consistent with the structure of the trimer being perfluoro-2,3,5-trimethylhexene-3. The structure was further confirmed by nuclear magnetic resonance.

Similar studies were carried out on the trimer boiling

Table I

| Run # | Perfluoro-olefin | Quantity of perfluoro-olefin in g. | Solvent | Quantity of solvents in ml. | Catalyst | Quantity of catalyst in g. | Reaction temperature in °C. | Reaction time in hours | Weight of Products in g. |
|---|---|---|---|---|---|---|---|---|---|
| 1 | hexafluoropropylene | 75 | dimethylformamide | 100 | NaBr | 26 | 100 | 6 | 21 Dimers. 12 Trimers. |
| 2 | do | 75 | do | 100 | NaBr | | 150 | 1 | 8 Dimers. 18 Trimers. |
| 3 | do | 120 | do | 25 | NaCl | 5 | 100 | 2 | 78.9. |
| 4 | do | 100 | do | 75 | NaF | 1 | 100 | 2 | 21 (13 ml.). |
| 5 | do | 100 | do | 75 | KBr | 1 | 100 | 2 | 98 (65 ml.). |
| 6 | do | 100 | do | 75 | NaCl | 0.1 | 100 | 2 | 90 (60 ml.). |
| 7 | do | 150 | do | 75 | NaHF$_2$ | 2 | 100 | 2 | 32 (20 ml.). |
| 8 | do | 100 | dimethylsulfoxide | 50 | NaBr | 5 | 100 | 2 | 87. |
| 9 | do | 100 | | 50 | KBr | 5 | 100 | 2 | 90. |
| 10 | do | 150 | dimethyl aniline | 100 | MeOH | 1 ml. | 100 | 2 | 125 Dimers. 15 Trimers. |
| 11 | do | 75 | dimethylformamide | 75 | (CH$_3$)$_4$NCl | 1 | 100 | 2 | 71. |
| 12 | do | 75 | | 75 | KHF$_2$ | 5 | 28 | 2.5 | 14.3 Dimers. 56.7 Trimers. |
| 13 | do | 75 | Benzene | 200 | dilauryldimethyl-ammoniumchloride. | 5 | 200 | 3 | 67. |
| 14 | do | 75 | dimethylformamide | 75 | | 2 | 100 | 3 | 70. |
| 15 | do | 75 | cyclohexane | 75 | | 5 | 200 | 3 | 65. |
| 16 | do | 75 | N,N-dimethyl aniline | 75 | benzyltrimethyl ammonium hydroxide. | 1 | 100 | 2 | 72. |
| 17 | do | 75 | dimethylsulfoxide | 59 | | | 100 | 2 | 48.5. |
| 18 | do | 75 | dimethylformamide | 75 | NaOH | 1 | 100 | 2 | 38.5. |

The crude, washed and dried products obtained were distilled. A dimer fraction boiling at 46° to 50° C. and a trimer fraction boiling at 105° to 114° C. were obtained. The dimer fraction obtained was redistilled through a 100 theoretical plate Podbielniak column. There were obtained two dimers having boiling points at 46° C. and 50.5° C. respectively. Infrared analysis of the dimer boiling at 46° C. showed absence of a band at 5 to 7 microns indicated either a lack of unsaturation or an internal trans-unsaturation. Raman analysis showed an intense band at 1730 cm.$^{-1}$, thus indicating that there was an internal double bond. Oxidation of this dimer in an aqueous medium at 100° C. for two hours using alkaline sodium permanganate resulted in the formation of fluoroform and 2-hydroheptafluoropropane. In accordance with the teachings of La Zerte et al. (Journal of American Chemical Society 75, 4525, 1953) the oxidation results confirmed the structure of the dimer to be perfluoro-4-methylpentene-2

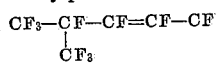

Further confirmation was obtained by nuclear magnetic resonance analysis.

at 114° C. Infrared analysis showed a strong band at 6.17 microns and oxidation with alkaline sodium permanganate resulted in the formation of fluoroform. The structure of the trimer boiling at 114° C. is thus consistent with perfluoro-2,3,5-trimethylhexene-2, which was further confirmed by nuclear magnetic resonance.

A third trimer having a boiling point of 105° C. to 106° C. was found to have an infrared band at 5.98 microns. The nuclear magnetic resonance analysis indicated the olefin to be perfluoro-2,4,5-trimethylhexene-2.

EXAMPLE II

Into a reaction vessel was charged 25 ml. of perfluoro-2,3,5-trimethylhexene-3, 50 ml. of dimethylformamide, and 1 g. of potassium bifluoride. The reaction vessel was heated to 100° C. was agitated under autogeneous pressure for a period of two hours. On discharge of the reaction mixture, the fluorocarbon fraction was separated, dried and distilled. There was obtained a 55% yield of perfluoro-2,4,5-trimethylhexene-2 boiling at 105 to 106° C., 30% of unreacted perfluoro-2,3,5-trimethylhexene-3 boiling at 110° C. and a 15% yield of perfluoro-2,3,5-trimethylhexene-2 boiling at 114° C.

EXAMPLE III

Into a reaction vessel was charged under nitrogen, 40 ml. of perfluoro-4-methylpenetene-2 boiling at 46° C. and 50 ml. of dimethylformamide, and 1 g. of potassium bifluoride. The reaction vessel was heated to 100° C. and agitated under autogeneous pressure for a period of two hours. On discharge of the reaction mixture, the fluorocarbon layer was separated, washed, dried and distilled. A quantitive conversion to perfluoro-2-methylpentene-2 boiling at 50.5° C. was obtained.

EXAMPLE IV

Into a reaction vessel was charged 10 ml. of 8-hydroperfluorooctene-1, having a boiling point at 70 to 72° C., 100 ml. of dimethylformamide, and 1 g. of potassium bifluoride. The reaction mixture was stirred for a period of 16 hours at room temperature. The fluorocarbon layer was separated, washed and dried and distilled through a spinning band column. There was obtained 7.5 ml. of product boiling at 62 to 64° C. The compound was identified as 1-hydroperfluorooctene-1.

EXAMPLE V

Into a glass vessel equipped with stirrer, thermometer and gas inlet was charged 5 g. of potassium bifluoride and 75 ml. of dimethylformamide. The system was flushed with hexafluoropropylene and agitation initiated. The hexafluoropropylene pressure was maintained at 1 to 40 mm. Hg and the reaction temperature was maintained at 25 to 30° C. The run was contained for 2.5 hours giving rise to 71 g. liquid product. On distillation, there was obtained 14.3 g. of hexafluoropropylene dimer comprising 98% perfluoro-4-methylpentene-2 and 2% of perfluoro-2-methylpentene-2 and 56.7 g. of hexafluoropropylene trimer comprising 44% of perfluoro-2,3,5-trimethylhexene-3 and 51% perfluoro-2,3,5-trimethylhexene-2.

The internally unsaturated perfluoroolefins obtained by the process of the present invention are extremely useful as solvents in view of their volatility and chemical and heat stability. Thus the perfluorocarbons of the present invention have been heated to 650° C. without decomposition. They have been heated in the presence of air at a temperature of 350° C. for an extended period of time without decomposition. The double bond of the perfluoroolefins of the present invention was found to be very stable. Homopolymerization of these fluoroolefins with known polymerization techniques was found to be unsuccessful. Although copolymerization of the perfluorocarbons of the present invention with ethylene and other ethylenic compounds is feasible, extremely severe reaction conditions must be employed. The compounds of the present invention are therefore useful as solvents and as reaction media, particularly where fluorinated compounds are employed. The fluorocarbons of the present invention may further be employed as refrigerants.

In addition to forming the novel dimers and trimers of perfluoropropylene, the process of the present invention may be employed to isomerize perfluoroolefins to internally unsaturated olefins. The novel compounds, thus obtained may be employed as intermediates in the preparation of other valuable compounds through attack on the internal double bond.

We claim:

1. Internally unsaturated perfluorocarbons having structures of the class consisting of

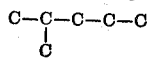

and

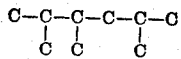

said perfluorocarbons having one ethylenic double bond, said ethylenic bond being between non-terminal carbon atoms.

2. An internally unsaturated perfluorocarbon having the structure

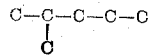

said perfluoroolefin having one ethylenic double bond, said ethylenic bond being between non-terminal carbon atoms.

3. Perfluoro-4-methylpentene-2.

4. Perfluoro-2-methylpentene-2.

5. An internally unsaturated perfluorocarbon having the structure

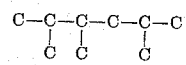

said perfluoroolefin having one ethylene double bond, said ethylenic bond being between non-terminal carbon atoms.

6. Perfluoro-2,3,5-trimethylhexene-3.

7. Perfluoro-2,3,5-trimethylhexene-2.

8. Perfluoro-2,4,5-trimethylhexene-2.

9. The process of preparing internally unsaturated perfluoroolefins which comprises contacting a terminally unsaturated perfluoroolefin having at least 3 carbon atoms with a catalyst-solvent combination of the class consisting of (a) halides and hydroxides of metals of group I of the periodic table of elements as the catalyst in combination with solvents of the class consisting of N,N-dialkylamides, N,N-dialkylphenylamines and dialkylsulfoxides, and (b) quaternary ammonium compounds having the general formula $NR_4X$ where R is a hydrocarbon radical and X is an anion as the catalyst component in combination with inert solvents of the class consisting of hydrocarbons, N,N-dialkylamines and N,N-dialkylamides at a temperature of 0° to 200° C. and recovering an internally unsaturated perfluoroolefin.

10. The process as set forth in claim 9 wherein the terminally unsaturated perfluoroolefin is hexafluoropropylene.

11. The process of preparing internally unsaturated perfluoroolefins which comprises contacting hexafluoropropylene with a catalyst comprising an alkali metal halide in the presence of a solvent selected from the class consisting of N,N-dialkylamides and dialkylsulfoxides, said alkyl groups having from 1 to 3 carbon atoms at a temperature of 0 to 200° C., and recovering a mixture of internally unsaturated perfluoroolefins having the formulas $C_6F_{12}$ and $C_9F_{18}$.

12. The process as set forth in claim 11 wherein the alkali metal halide is an alkali metal fluoride.

13. The process as set forth in claim 12 wherein the alkali metal fluoride is an alkali metal bifluoride.

14. The process of preparing internally unsaturated perfluoroolefins which comprises contacting hexafluoropropylene with a catalyst of the class consisting of quaternary ammonium compounds having the general formula $R_4NX$ wherein R is a hydrocarbon radical, and X is a halogen in the presence of an inert solvent selected from the class consisting of hydrocarbons, N,N-dialkylamides and N,N-dialkylphenylamines, said alkyl groups having from 1 to 3 carbon atoms at a temperature of 100 to 200° C., and recovering a mixture of internally unsaturated perfluoroolefins having the formulas $C_6F_{12}$ and $C_9F_{18}$.

References Cited in the file of this patent

UNITED STATES PATENTS

| | | |
|---|---|---|
| 2,668,864 | Hals et al. | Feb. 9, 1954 |
| 2,716,141 | Miller | Aug. 23, 1955 |

OTHER REFERENCES

Miller: abstract of application Ser. No. 47,553, published Jan. 8, 1952, 654 O.G. 632.

Chemical Abstracts, vol. 50, 5521c, April 25, 1956.

UNITED STATES PATENT OFFICE
CERTIFICATE OF CORRECTION

Patent No. 2,918,501                                         December 22, 1959

Warren John Brehm et al.

It is hereby certified that error appears in the printed specification of the above numbered patent requiring correction and that the said Letters Patent should read as corrected below.

Columns 3 and 4, Table I, under the heading "Quantity of perfluoroolefin in g." line 3, for "120" read -- 125 -- same table, under the heading "Solvent", lines 9 and 12, strike out leaders and insert instead -- --do-- --; same table, under the heading "Catalyst", lines 14 and 15, strike out leaders and insert instead -- --do-- --; same table, under the heading "Quantity of catalyst in g.", line 2, strike out leaders and insert instead -- --do-- --; column 5, line 31, for "contained" read -- continued --.

Signed and sealed this 31st day of May 1960.

(SEAL)
Attest:

KARL H. AXLINE                                              ROBERT C. WATSON
Attesting Officer                                         Commissioner of Patents